United States Patent [19]

Prokopp

[11] Patent Number: 5,265,986
[45] Date of Patent: Nov. 30, 1993

[54] MULTIPLE SPINDLE MACHINE FOR DRILLING, MILLING OR THE LIKE

[75] Inventor: Manfred Prokopp, Wertheim-Reicholzheim, Fed. Rep. of Germany

[73] Assignee: atg electronic GmbH, Wertheim-Reicholzheim, Fed. Rep. of Germany

[21] Appl. No.: 739,859

[22] Filed: Aug. 2, 1991

[30] Foreign Application Priority Data

Aug. 7, 1990 [DE] Fed. Rep. of Germany ....... 4025007
Oct. 22, 1990 [DE] Fed. Rep. of Germany ....... 4033520

[51] Int. Cl.$^5$ .............................................. B23B 39/24
[52] U.S. Cl. .......................................... 408/3; 408/16; 408/43; 408/50
[58] Field of Search ................... 408/3, 42, 43, 50, 53, 408/16

[56] References Cited

U.S. PATENT DOCUMENTS

| | | | |
|---|---|---|---|
| 3,663,114 | 5/1972 | Welsh et al. | 408/3 |
| 4,088,417 | 5/1978 | Kosmowski | 408/43 X |
| 4,596,500 | 6/1986 | Raiteri | 408/3 |
| 4,728,229 | 3/1988 | Memmel et al. | 408/53 X |
| 4,761,876 | 8/1988 | Kosmowski | 408/3 X |

FOREIGN PATENT DOCUMENTS

| | | | |
|---|---|---|---|
| 382476 | 8/1973 | U.S.S.R. | 408/3 |
| 770674 | 10/1980 | U.S.S.R. | 408/43 |

*Primary Examiner*—Steven C. Bishop
*Attorney, Agent, or Firm*—Anderson Kill Olick & Oshinsky

[57] ABSTRACT

A multispindle machine for drilling, milling or the like of workpieces has several spindles mounted on at least one crossbeam rail (4), and the workpieces and spindles can be displaced relative to one another along X and/or Y coordinates. To minimize machining time, each crossbeam rail mounts at least two spindles (3) which are displaceably independently of one another in the long direction or X coordinate of the crossbeam rail (4).

20 Claims, 6 Drawing Sheets

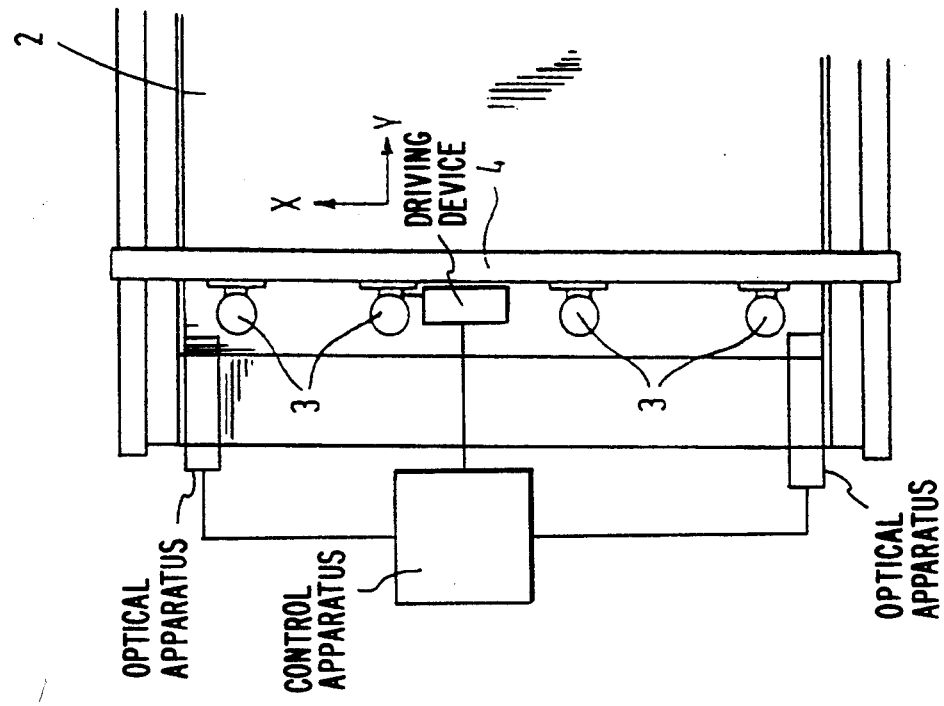
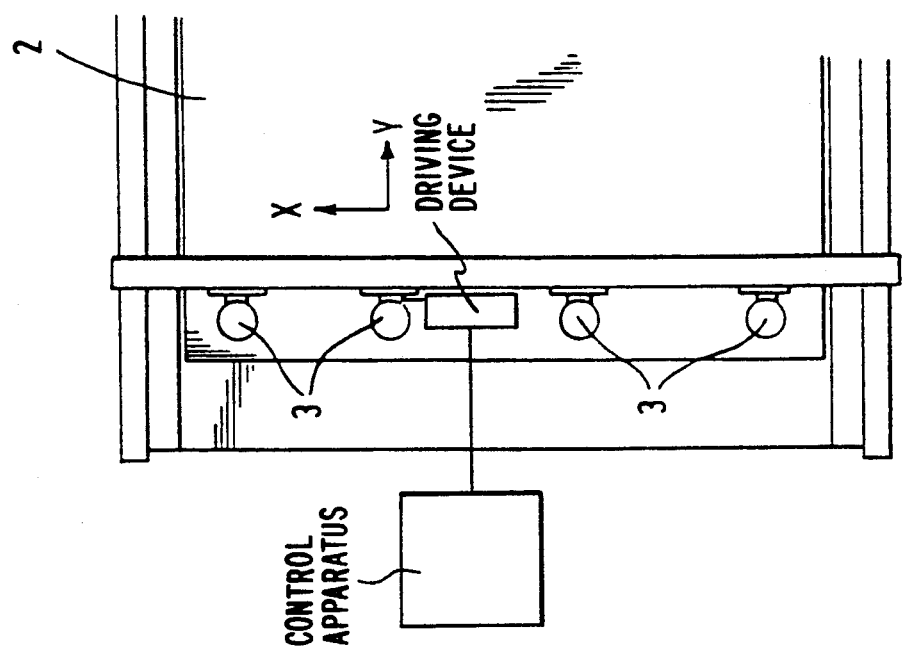

MULTIPLE SPINDLE MACHINE FOR DRILLING, MILLING OR THE LIKE

BACKGROUND OF THE INVENTION

The invention is directed to a multispindle machine for drilling, milling or the like of workpieces, with several spindles mounted on at least one crossbeam rail with the workpieces and spindles movable relative to one another along X and Y coordinates.

Computerized numerically controlled precision multispindle and profile milling machines, such as used in machining circuit boards, metal plates and the like, are known in machine tool technology. These machines have several spindles each receiving a tool bit. Workpieces and spindles can be displaced relative to one another along X and Y coordinates, so that each desired point of a work table of the machine can be reached. Furthermore, the spindles can be lowered in the Z direction for moving the tool bit towards the workpiece. There is the advantage with a multispindle arrangement that a corresponding number of machine steps can be performed simultaneously, such as the machining of bores. To perform such a step, the spindles are fixedly aligned relative to one another.

The spindles can be used simultaneously in such a predetermined position.

These multispindle machines are used among other things for the fabrication of panels for printed circuits. The spindles are equipped with drill bits for producing interlayer connections and/or receiving holes for the terminal wires of electronic components.

Since the previously mentioned workpieces must often be provided with thousands of bores, there is the requirement for the multispindle machine that only short machining periods are used. Because of the plurality of spindles in the known machines, several bores can be drilled at the same time, and several identical workpieces can be drilled at the same location, however, the machining period for fabricating a workpiece is still relatively long.

SUMMARY OF THE INVENTION

Therefore, the primary object of the present invention is to provide a multispindle machine of the type discussed above which affords the performance of a plurality of machining steps in a particularly short period of time.

In accordance with the present, at least two spindles are provided on each crossbeam rail and can be moved in the long direction of the rail independently of one another. This inventive arrangement has the advantage that when using drill bits a quantity of bores corresponding to the number of spindles can be produced simultaneously, however, the relative position of the individual spindles with respect to one another can be changed after each drilling step. Accordingly, it is possible for the spindles to simultaneously perform a drilling operation in the setup relative positions, or one or several spindles can be in the process of changing position, while one or several of the remaining spindles on the crossbeam rail can perform a machining operation on a workpiece. As a result, in machining an individual workpiece, that is, forming individual bores, it is possible to afford extremely short machining periods. Thus, it is possible among other things that several bores having the same Y coordinates are drilled at the same time. Furthermore, the individual spindles can be moved individually along the Z coordinates independently of one another at a desired point in time, so that an appropriate depth can be obtained.

In one embodiment of the present invention, at least one of the spindles on each crossbeam rail is displaceable relative to the rail transversely of the long direction of the rail. Accordingly, the use of as many spindles as possible can be carried simultaneously, even when only a few bores lie on an axial line running parallel to the long direction of the crossbeam rail, however, bores can be formed in the immediate vicinity of such axial line. The positioning of the crossbeam rail relative to the workpiece then occurs so that all bores located within the region formed by the additional transverse displacement of the spindles can be reached. Preferably, all of the spindles mounted on a crossbeam rail can have this feature of transverse displaceability.

In another embodiment of the invention, in addition to the transverse displaceability, the spindles can also be displaced in the long direction of the crossbeam rail within a small region in addition to the displaceability of the rail, whereby the spindle, guided on a trolley or the like at the crossbeam rail, can be moved into a specific position by means of the trolley, with the spindle also being displaceable relative to the trolley in the lateral direction and/or in the long direction of the rail. The mobility in the long direction can be used to form bores lying close to one another. For this purpose, the trolley, guided on the crossbean rail, initially is brought into the position of the bore and then the bore is drilled. Subsequently, the trolley is not moved along the crossbeam rail, rather an additional position is reached by the additional adjustability of the spindle relative to the trolley, so that an adjacent bore can be machined.

A positioning device is provided for the displaceability of the spindle relative to the trolley or the like. Such positioning device, which enables only small adjustment movement, can be in the form of a piezo-adjustment element. As an alternative, it is also possible to use a positioning device comprising a microactuation motor.

In still another embodiment of the invention, the workpiece is displaceable transversely of the long direction of a fixed crossbeam rail.

Alternatively, it is also possible for a workpiece support to be arranged stationary while the crossbeam rail is displaceable transversely of its long direction. Accordingly, the spindles and the workpiece or workpieces can be moved relative to one another in the direction of the Y coordinate. The X coordinate of each spindle can be changed by moving the spindle in the long direction of the crossbeam rail.

Where several crossbeam rails are used, it is advantageous that they be displaceable independently of one another. Consequently, the individual spindles on a crossbeam rail can move relative to and independently of one another while the different crossbeam rails can move relative to and independently of one another.

In yet another embodiment of the invention, each crossbeam rail and/or each spindle can be moved by a separate driving device. Preferably, the individual driving devices are actuated by a program controlled actuating device.

Preferably, the driving devices can be formed as linear motors. It is possible to place a post along the crossbeam rail and to provide one slide for each of the individual spindles whereby the slide is displaceable along the post. This same arrangement is also available for the displacement of the crossbeam rail. As an example, a post arrangement of the linear driving devices is made stationary with respect to the workpiece support or worktable and a slide arrangement is provided at the crossbeam rails. Alternatively, it is also possible to move the crossbeams rails and/or the spindles by conventional means, for instance, by servo motors and appropriate mechanical transmission means, such as threaded spindles. To achieve a high positioning accuracy and also a repetitive accuracy in the positioning operation, the position of the spindles and/or the crossbeams rails is effected by a positioning regulation circuit which is supplied with respective momentary values by a Heidenhain-linear-measuring system with a glass rod.

In a further embodiment of the invention, the spindles are arranged so that they can simultaneously machine the workpiece from two opposite sides. It is especially possible to form bores simultaneously from different sides of the workpiece located so closely together that is impossible to machine the bores by spindles located on one side of the workpiece, since the spindles would interfere with one another. With simultaneous machining from opposite sides interference can not occur, since it is only the drilled diameters which determine the least distance of the spindles.

A workpiece support is provided for fastening one or more workpieces. It can be arranged so that the workpieces, such as plates, are held in a vertical position. Such an arrangement has the advantage, because of gravity, that no bending of the plates takes place. When machining the workpieces from one side or from both sides, the individual spindles rotate about horizontal axes.

To obtain particularly short machining times, several crossbeam rails can be arranged on one or both sides of the workpiece.

Preferably, the above mentioned control device controls the driving of the devices so that the spindles cover travel distances that are as short as possible from one machining operation to the next while being free of any collision. Moreover, this also shortens the machining time.

It is particularly preferred if the driving units mentioned above are activated by the control device so that either a single workpiece is machined all at the one time by several spindles or several workpieces are machined with one spindle or several workpieces are machined with several spindles. These possibilities afford a particularly extensive variety of uses always with short machining time periods.

It is particularly advantageous if the multispindle machine includes an optical apparatus for detecting the position of the workpiece. To detect the position of the workpiece, the optical apparatus determines the position of a marking or the like on the workpiece. The positioning data are fed to the control device. Consequently, the control apparatus receives information about the position of the workpiece. Accordingly, the control device actuates the driving means for positioning the spindles with regard to the determined position of the workpiece. This feature has the advantage that expensive mechanical devices for automatically feeding the workpieces to the spindle machine in a precisely determined position can be eliminated. Instead, considerably more simple feed devices can be used, since the accurate positioning of the workpiece is not important. Consequently, the workpieces are clamped in the desired position. Subsequently, the optical apparatus determines the individual workpiece position by optically scanning a marking on the workpiece. If the workpiece is a circuit board to be drilled, it can be provided with a marking cross, or the coordinates of a long lateral side of the circuit boards can be determined for finding the position. During actuation the acquired coordinates are taken into account in positioning the spindles and/or the crossbeam rail and/or the workpiece support. The workpiece coordinates are used in the software when computing the machining coordinates, such as the drilling coordinates. Accordingly, the machining process is considerably simplified.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3 is a schematic plan view of another embodiment of the present invention; and.

FIG. 10 is a schematic illustration of a control apparatus for actuating driving devices; and FIG. 11 is a schematic illustration of an optical apparatus for rotating a workpiece.

DETAILED DESCRIPTION OF THE INVENTION

Figure 1:
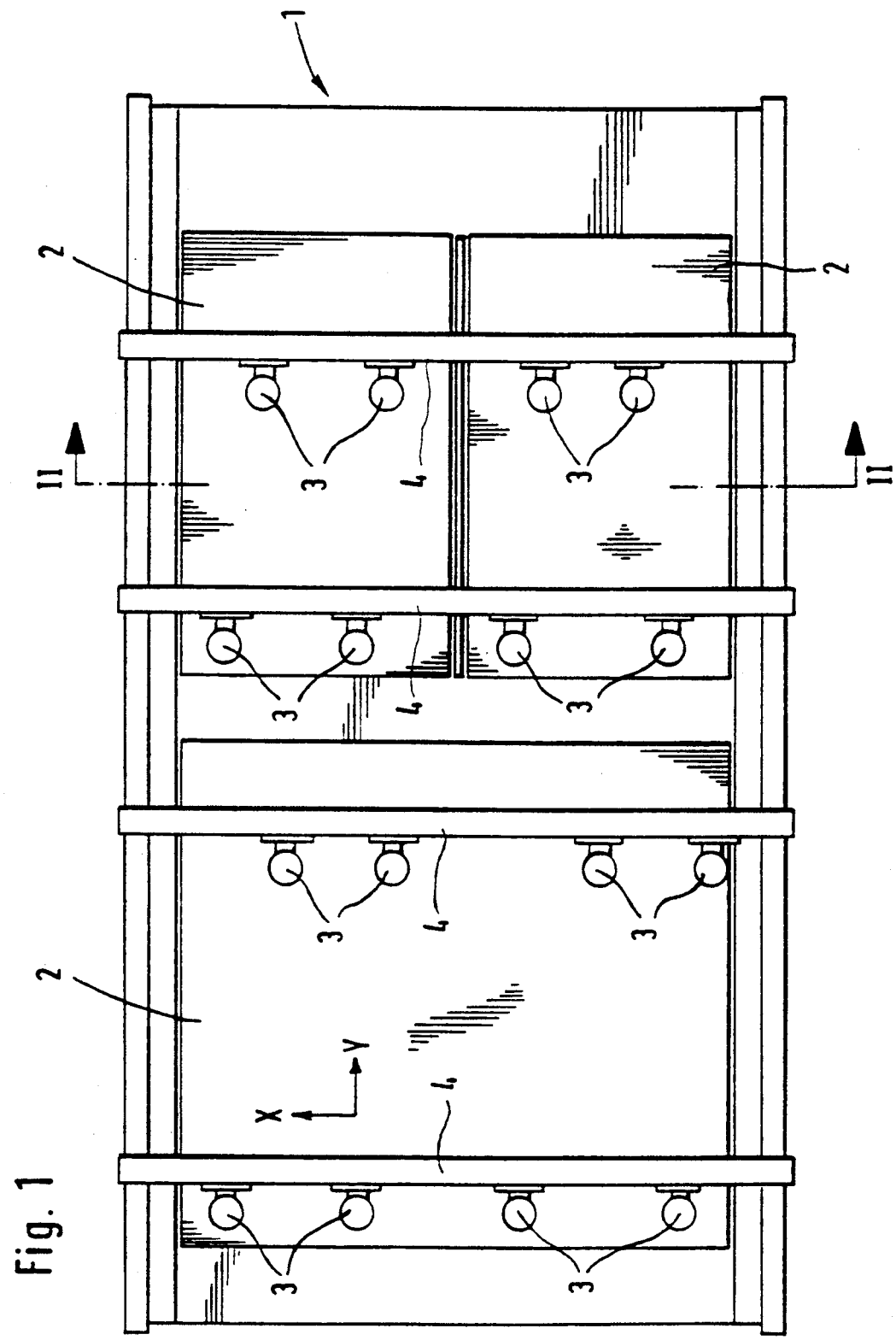
FIG. 1 is schematic plan view of a multispindle machine on a worktable embodying the present invention.

FIG. 1 is a schematic showing in plan view, of a worktable 1 of a multispindle machine for boring, milling or the like. Only the components essential for the invention are illustrated. Accordingly, parts necessary for the functioning of the machine but not involved in the invention have been omitted.

Workpieces 2, shown in dot dash lines, are clamped to the worktable 1. The workpieces 2 are plates provided with bores for receiving spring contact pins. These bores are formed by spindles 3 (boring spindles) equipped with appropriate chucks for receiving the drill bits and including a drive for providing rotational movement. The individual spindles 3 are mounted on crossbeam rails 4 for movement in the long direction of the rails. Note the X and Y coordinates shown in FIG. 1, that is, coordinates at right angles to one another, where the X coordinate indicates the direction of movement in the long direction of the rails 4.

In accordance with the invention, several spindles 3 are provided at each crossbeam rail 4 and are displaceable in the long direction of the rail or the X coordinate direction, independently of one another. In the FIG. 1 embodiment, four spindles 3 are mounted on each crossbeam rail 4. The embodiment displayed in FIG. 1 includes four crossbeam rails 4, whereby there is a total of sixteen spindles 3. The individual crossbeam rails 3 are displaceable transversely, that is, perpendicular to the X coordinate in the direction of the Y coordinate. The invention is not limited to the indicated number of spindles 3 for each crossbeam rail 4 as shown in FIG. 1 nor is it limited to the illustrated number of crossbeam rails 4.

A separate driving device is provided for each spindle 3 on each crossbeam rail 4, so that the individual spindles can be moved in the X coordinate direction independently of one another. Furthermore, each crossbeam rail has a separate driving device, whereby the individual crossbeam rails 4 can be moved independently of one another in the Y coordinate direction. Control of the positions of the crossbeam rails 4 and spindles 3 is effected by a control device, note FIG. 3, which actuates the driving device.

Figure 7:
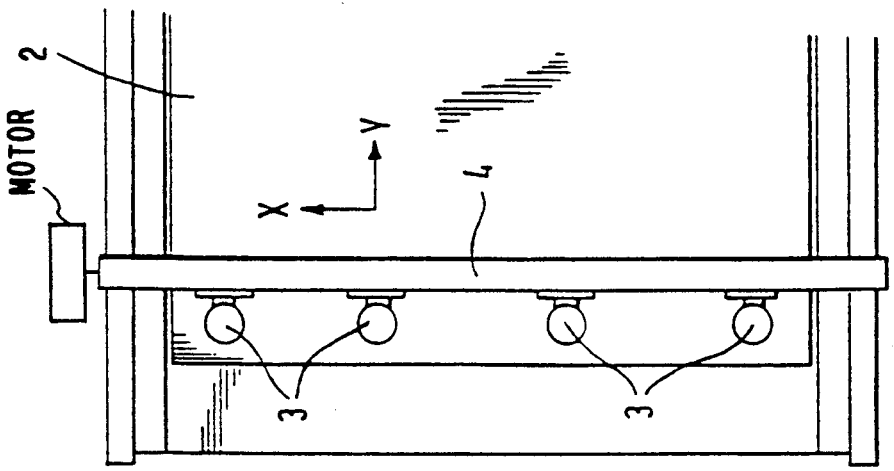
FIG. 7 is a schematic illustration of a linear motor acting as a separate driving device for crossbeam rails.
Figure 9:
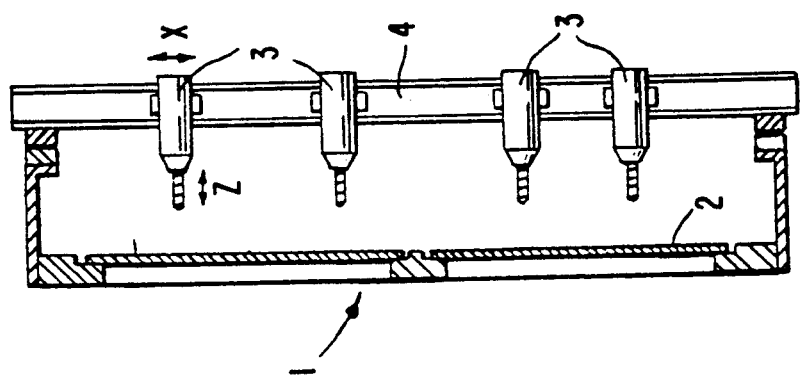
FIG. 9 is a schematic illustration of a vertical workpiece support with horizontally extending spindle axes.
Figure 8:
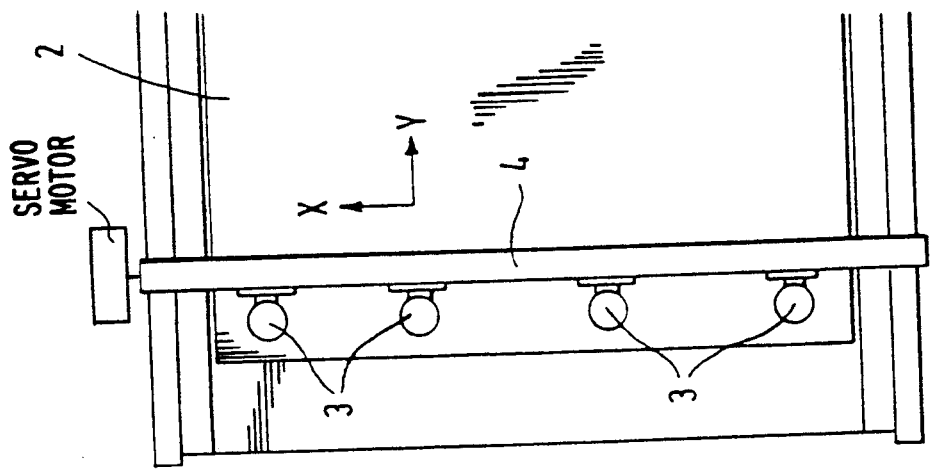
FIG. 8 is a schematic illustration of a servomotor acting as a separate driving device for crossbeam rails.

The driving devices can be servo motors, note FIG. 8, conventionally provided with regulation circuits which are connected with a spindle 3 or a crossbeam rail 4 by appropriate mechanical coupling links or, according to a preferred embodiment linear motors, note FIG. 7 can be used. In the case of linear motors, the worktable 1 is provided with a stator arrangement and the individual crossbeam rails incorporate slide arrangements of the linear motors. The same arrangement is provided for the spindles 3. Accordingly, each crossbeam rail 4 has a stator arrangement and the spindles 3 are equipped with slide arrangements of the linear motors. To assure movement of the correct crossbeam rail 4 or spindle 3, preferably a coded actuation can be provided.

Figure 2:
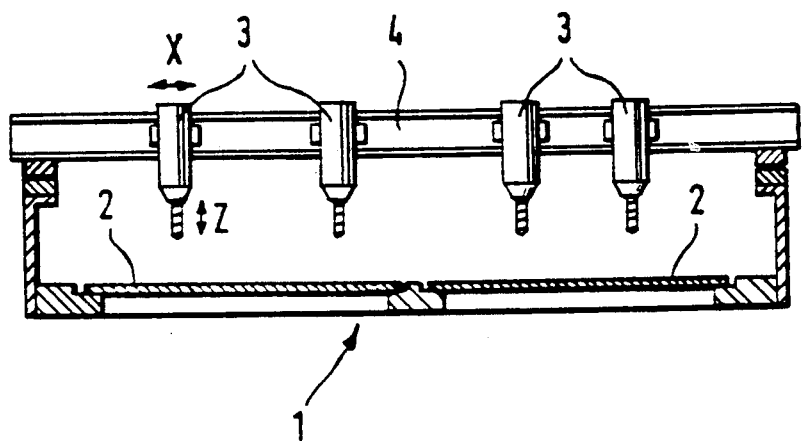
FIG. 2 is a side view taken along the line III—III in FIG. 1.

As can be noted in FIG. 2, the worktable is arranged horizontally and the machining operation of a plurality of workpieces takes place from the top, that is, from above the workpieces. In accordance with an embodiment, not shown, it is possible to perform the machining from opposite sides of the workpiece, whereby crossbeam rails 4 mounting spindles 3 are located on the opposite sides of the workpiece 2. In addition, it can be specially provided that the workpiece support is arranged so that the workpiece or workpieces 2 are held in a vertical position, note FIG. 3, whereby the worktable 1 extends vertically. Accordingly, the spindles are arranged with horizontal axes of rotation.

The above mentioned control device actuates the driving means for the crossbeam rails 4 and the spindles 3, so that travel paths as short as possible are obtained between machining steps, providing especially short machining periods. It is clear from FIG. 1 that the control program can actuate the driving devices so that a workpiece 2 is machined simultaneously by several spindles 3 or several workpieces 2 are simultaneously machined with one spindle 3 or several workpieces 2 are machined at the same time by several spindles 3, whereby in each case either one or several crossbeam rails 4 can be assigned to each workpiece 2.

Figure 3:
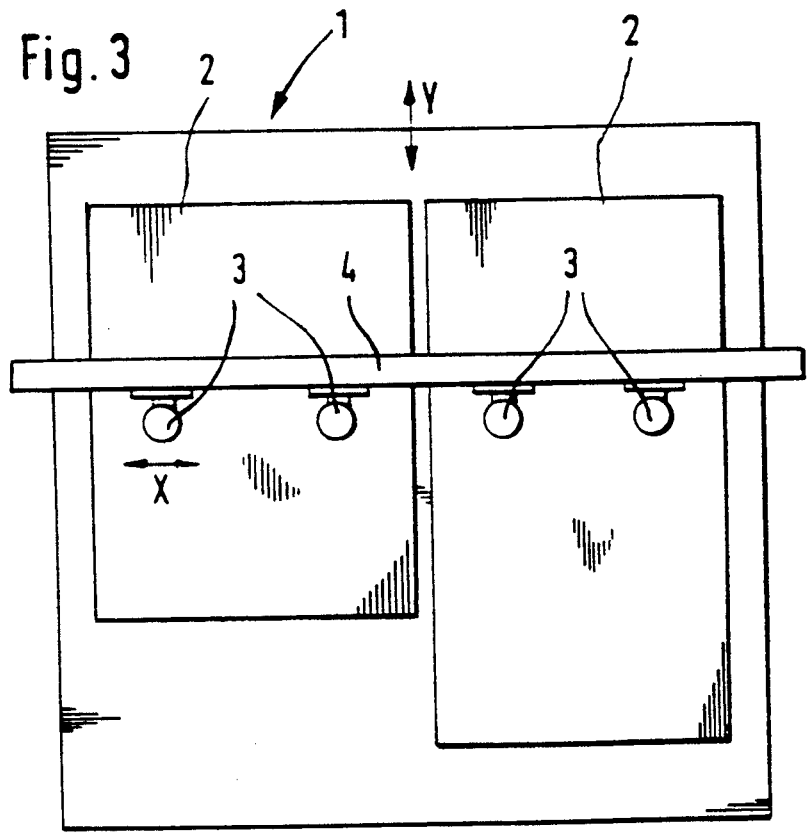

FIG. 3 shows another embodiment of the multispindle machine incorporating the present invention, and it differs from the embodiment in FIG. 1 in that the crossbeam rail 4 is stationary with respect to the machine stand. The workpiece support and also the worktable is displaceable in the direction of the Y coordinate. Four spindles 3 are located on the crossbeam rail 4 and are movable independently of one another along the X coordinate. In a specific position of the worktable all the bores lying on a given Y coordinate can be machined in two workpieces as shown in FIG. 3. Once the bores are drilled, movement into the next Y coordinate is effected and again all the bores lying in the coordinate are drilled.

Figure 4:
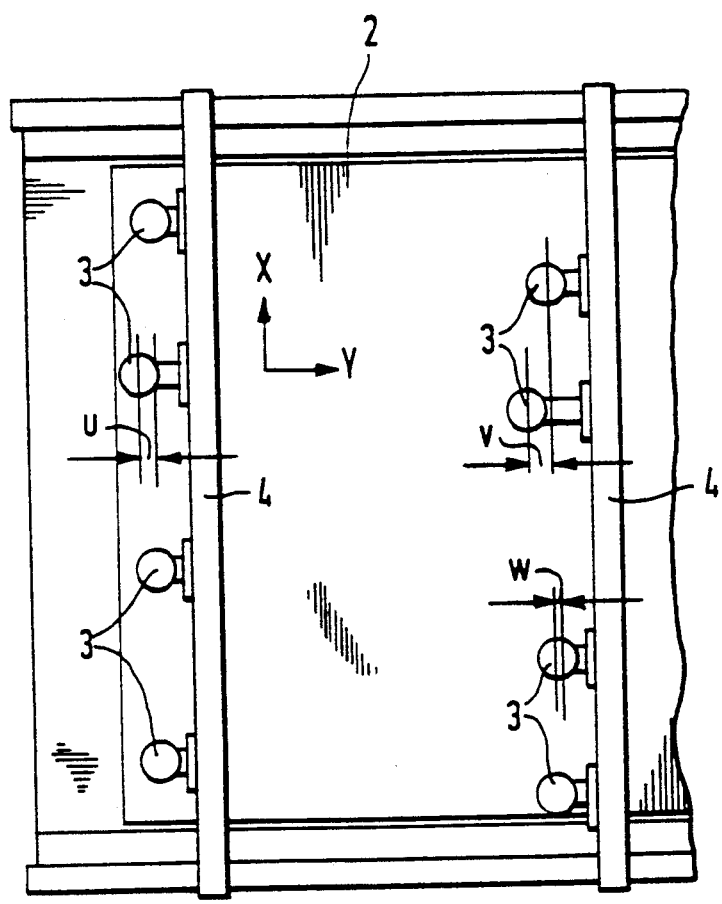
FIG. 4 is a schematic plan view of a partial region of another embodiment of the present invention similar to FIG. 1.
Figure 5:
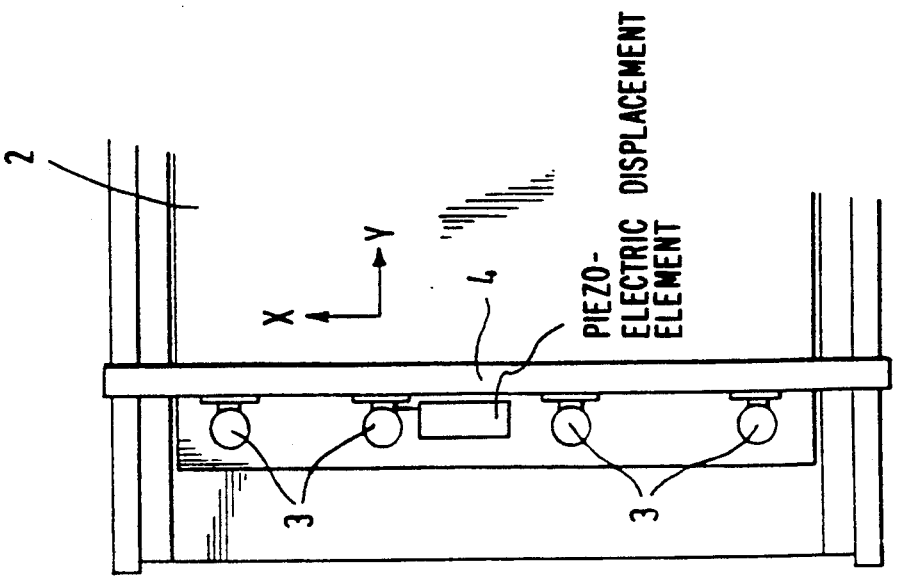
FIG. 5 is a schematic illustration of a piezo-displacement element for spindle transverse displacement.
Figure 6:
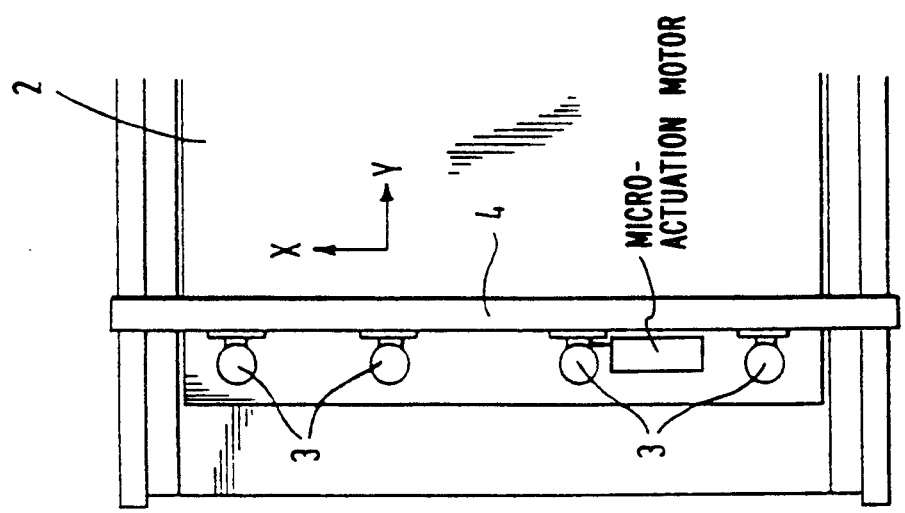
FIG. 6 is a schematic illustration of a microactuation motor for spindle transverse displacement.

In FIG. 4 another embodiment of the invention is illustrated and differs from the embodiment in FIG. 1 in that the individual spindles 3 of each crossbeam rail 4 are displaceable not only along the X coordinate but also along the Y coordinate relative to the crossbeam rail 4. Consequently, each crossbeam rail 4 can be moved along the Y coordinate relative to the workpiece 2, by holding either the workpiece 2 stationary and moving the crossbeam rail 4 or maintaining the crossbeam rail 4 stationary and moving the workpiece 2 or by displacing the workpiece 2 and the crossbeam rail 4 relative to one another. The individual spindles 3 are displaceable on the crossbeam rail along the X coordinate. In addition, it is possible to move each spindle 3 transversely of the X coordinate, that is the long direction of the crossbeam rail relative to the crossbeam rail so that the individual spindles 3 of each crossbeam rail 4 do not lie along a common Y coordinate but rather on different Y coordinates. As shown in FIG. 4, the individual spindle 3 on each crossbeam rail 4 can have a u or v or w spacing in the Y coordinate direction relative to the crossbeam rail 4 without changing the position of the rail. Accordingly, there is the possibility of utilizing at the same time as many spindles 3 on the crossbeam rail 4 as possible, even if the bores to be machined do not lie exactly on the same Y coordinate but rather lie within a given region in the Y coordinate direction. For this purpose, the crossbeam rail is aligned relative to the workpiece 2 so that all the drilling positions can be attained by displacement in the Y coordinate direction. Therefore, it is possible to achieve optimum utilization and, at the same time, additional reduction of the drilling time. This arrangement considerably increases the probability that all spindles 3 on a crossbeam rail 4 are used at the same time, preferably with the spindles 3 displaced perpendicularly to the long direction of the corresponding crossbeam rail 4. To achieve such operation, additional positioning devices, not shown, are required. The positioning devices permit displacement of the spindles relative to a corresponding trolley or the like guided at the crossbeam rail. Such positioning device can be constructed as a piezo displacement element, note FIG. 5, or as a microdisplacement motor, note FIG. 6, or the like.

In accordance with a preferred embodiment of the invention, a multispindle machine ,comprises an automatically operating optical apparatus, note FIG. 11, for detecting the position of the workpiece. Positions of several workpieces can also be detected. This provides the advantage that all of the workpieces in one machining group need not be clamped in the same position, rather they can be clamped in different positions. By detecting the position of the workpieces, it is possible, in spite of the different positions of the workpieces, to perform accurate machining, since the position coordinates can be computed into the machining software so that different workpiece positions are taken into account in setting the drilling coordinates of the individual spindles.

While specific embodiments of the invention have been shown and described in detail to illustrate the application of the inventive principles, it will be understood that the invention may be embodied otherwise without departing from such principles.

I claim

1. Multispindle machine for drilling, milling or the like on workpieces, comprising at least one crossbeam rail, at least two spindles mounted on the crossbeam rail, means for supporting workpieces for moving at least one of the spindles and the workpiece relative to one another along and X coordinate and along a Y coordinate perpendicular to the X coordinate, wherein the improvement comprises that each said crossbeam rail (4) is ¬longated in the direction of the X coordinate, and said at least two spindles (3) are displaceable independently of one another in the elongated direction of the crossbeam rail, and at least one of said spindles (3) on each said crossbeam rail is displaceable relative to said crossbeam rail transversely of the elongated direction of said crossbeam rail (4).

2. Multispindle machine, as set forth in claim 1, wherein said spindle (3) is displaceable transversely ofthe elongated direction of said crossbeam rail (4) relative to a trolley or the like guided on the crossbeam rail (4) by a positioning device.

3. Multispindle machine, as set forth in claim 1, wherein said spindle is displaceable perpendicularly to the elongated direction of said crossbeam rail (4).

4. Multispindle machine, as set forth in claim 2, wherein said positioning device is a piezo-displacement element.

5. Multispindle machine, as set forth in claim 2, wherein said positioning device comprises a microactuation motor for small displacement travel.

6. Multispindle machine, as set forth in claim 1, wherein said means for supporting workpieces comprises a workpiece support displaceable transversely of the elongated direction of a stationary said crossbeam rail (4).

7. Multispindle machine, as set forth in claim 1, wherein said means for supporting workpieces comprises a stationary workpiece support and said crossbeam rail (4) is displaceable relative to the workpiece support transversely of the elongated direction thereof.

8. Multispindle machine, as set forth in claim 1, wherein several said crossbeam rails (4) are arranged in parallel independently of one another.

9. Multispindle machine, as set forth in claim 8, wherein at least each of said crossbeam rails (4) and each of said spindles (3) are displaceable by a separate driving device.

10. Multispindle machine, as set forth in claim 9, wherein said driving devices are linear motors.

11. Multispindle machine, as set forth in claim 9, wherein said driving devices are servo motors.

12. Multispindle machine, as set forth in claim 1, wherein said spindles (3) are arranged on separate said crossbeam rails (4) for machining opposite sides of at least one said workpiece (2).

13. Multispindle machine, as set forth in claim 1, wherein a workpiece support is arranged for holding the workpiece in a vertical position.

14. Multispindle machine, as set forth in claim 13, wherein said spindles (3) have horizontally extending axes of rotation.

15. Multispindle machine, as set forth in claim 1, wherein a plurality of said crossbeams rails (4) are located on at least one side of the workpiece.

16. Multispindle machine, as set forth in claim 9, wherein a control apparatus actuates said driving devices so that the spindles move along a travel path as short as possible from one machining step to another machining step without colliding.

17. Multispindle machine, as set forth in claim 16, wherein the driving devices are actuated by the control apparatus so that one workpiece (2) is machined simultaneously by several said spindles (3) or several workpieces (2) are machined simultaneously with respect to at least one said spindle (3).

18. Multispindle machine, as set forth in claim 16, wherein an optical apparatus detects the position of the workpiece.

19. Multispindle machine, as set forth in claim 18, wherein said optical apparatus determines the position of a marking or the like on the workpiece (2) and supplies information about the position of the workpiece to the control apparatus.

20. Multispindle machine, as set forth in claim 19, wherein said control apparatus activates said driving devices for positioning the spindles (3) with reference to determined workpiece positions.

* * * * *